US008890350B2

(12) United States Patent
Brust et al.

(10) Patent No.: US 8,890,350 B2
(45) Date of Patent: Nov. 18, 2014

(54) TURBOMACHINE DRIVE ARRANGEMENT

(75) Inventors: Eric A. Brust, Machesney Park, IL (US);
David S. Behling, Belvedere, IL (US);
Glenn C. Lemmers, Jr., Loves Park, IL
(US)

(73) Assignee: Hamilton Sundstrand Corporation,
Windsor Locks, CT (US)

( * ) Notice: Subject to any disclaimer, the term of this patent is extended or adjusted under 35 U.S.C. 154(b) by 315 days.

(21) Appl. No.: 13/350,001

(22) Filed: Jan. 13, 2012

(65) Prior Publication Data
US 2013/0181452 A1 Jul. 18, 2013

(51) Int. Cl.
*F02C 6/00* (2006.01)
*H02K 7/18* (2006.01)

(52) U.S. Cl.
USPC .............................................. 290/52; 290/54

(58) Field of Classification Search
USPC .......................................................... 290/52
See application file for complete search history.

(56) References Cited

U.S. PATENT DOCUMENTS

| | | | | |
|---|---|---|---|---|
| 4,922,119 A * | 5/1990 | Raad et al. | .............. | 290/31 |
| 5,003,772 A * | 4/1991 | Huber | .............. | 60/259 |
| 5,018,351 A * | 5/1991 | Otte | .............. | 60/448 |
| 6,145,308 A * | 11/2000 | Bueche et al. | .............. | 60/398 |
| 6,247,900 B1 * | 6/2001 | Archibald et al. | .......... | 417/222.1 |
| 6,836,086 B1 | 12/2004 | Goldberg et al. | | |
| 6,838,778 B1 | 1/2005 | Kandil et al. | | |
| 6,838,779 B1 | 1/2005 | Kandil et al. | | |
| 7,250,688 B2 | 7/2007 | Thomson et al. | | |
| 7,253,535 B2 | 8/2007 | Duesterhoeft | | |
| 7,472,547 B2 * | 1/2009 | Grosskopf et al. | .............. | 60/489 |
| 7,874,163 B2 | 1/2011 | Merry et al. | | |
| 7,952,220 B2 | 5/2011 | Rozman et al. | | |
| 8,018,086 B2 | 9/2011 | Legros | | |
| 2005/0247059 A1 | 11/2005 | Cogswell et al. | | |
| 2010/0156113 A1 | 6/2010 | Lemmers, Jr. | | |
| 2010/0167863 A1 * | 7/2010 | Lemmers, Jr. | .............. | 475/150 |
| 2011/0185723 A1 * | 8/2011 | Ganzel | .............. | 60/547.1 |
| 2011/0225978 A1 * | 9/2011 | Behling et al. | .............. | 60/788 |
| 2011/0314963 A1 * | 12/2011 | Poisson | .............. | 74/665 F |
| 2012/0159960 A1 * | 6/2012 | Brust et al. | .............. | 60/778 |
| 2013/0098052 A1 * | 4/2013 | Bedrine et al. | .............. | 60/772 |

* cited by examiner

*Primary Examiner* — Tulsidas C Patel
*Assistant Examiner* — Viet Nguyen
(74) *Attorney, Agent, or Firm* — Cantor Colburn LLP

(57) ABSTRACT

An arrangement and method for driving a turbomachine having a rotor is provided. The arrangement includes an input shaft rotationally coupled to the rotor. A motor generator device has a motor mode of operation and a generator mode of operation. A differential gear device having a first portion rotationally coupled to the input shaft and a second portion rotationally coupled to the motor generator device. A hydraulic assembly is rotationally coupled between the differential gear and the input shaft. The hydraulic assembly has a plurality of pistons and a pair of wobbler plates. A controller is operably coupled to the input shaft, the motor generator device and the hydraulic assembly, wherein the controller includes a processor that is responsive to executable instructions when executed on the processor for moving the pair of wobbler plates to a first position during a motor mode of operation.

10 Claims, 4 Drawing Sheets

TURBOMACHINE DRIVE ARRANGEMENT

BACKGROUND OF THE INVENTION

This disclosure relates generally to a drive arrangement for a turbomachine and in particular to an arrangement that drives the turbomachine during a first mode of operation and generates electrical power during a second mode of operation.

Turbomachines, such as gas turbine engines are known. A typical turbomachine includes multiple sections, such as a fan section, a compression section, a combustor section and a turbine section. Many turbomachines, particularly gas turbine engines, have large rotors in the compression section that are accelerated to high rotational speeds until the rotor is rotating fast enough to sustain operation of the turbomachine. Typically, a motor separate from the turbomachine drives an input shaft that is used to accelerate the rotors.

Many turbomachines use generators to produce electric power for various components, such as components on an aircraft. Some turbomachines use generators separate from the motor that drives the rotors. Integrated drive generators (IDG's) are an example of this type of generator, which can produce constant frequency electric power. As can be appreciated, the generator separate from the motor undesirably adds weight and complexity to the turbomachine.

Other turbomachines use the motors as generators after the turbomachine is self-sustaining. The turbomachine drives these generators. A variable frequency starter generator (VFSG) is an example of this type of generator. VFSGs generate electric output power with a frequency that is proportional to the turbomachine speed. Electrical usage equipment must then be capable of operating under this variable frequency input, which generally increases their weight, size envelope, power losses and cost. Some arrangements of this type include complicated shafting, gearing, clutching or valving to enable both start and generate modes of operation.

Accordingly, while existing turbomachines are suitable for the intended purposes the need for improvement remains, particularly in providing a starter generator that provides constant frequency output and also produces additional torque at lower rotational speeds.

BRIEF DESCRIPTION OF THE INVENTION

According to an embodiment of the invention, an arrangement for driving a turbomachine having a rotor is provided. The arrangement including an input shaft rotationally coupled to the rotor. A motor generator device is provided having a motor mode of operation and a generator mode of operation. A differential gear device having a first portion is rotationally coupled to the input shaft and a second portion rotationally coupled to the motor generator device. A hydraulic assembly having a third portion is rotationally coupled to the first portion and a fourth portion rotationally coupled to the second portion, the hydraulic assembly having a plurality of pistons and a pair of wobbler plates coupled between the third portion and the fourth portion, the pair of wobbler plates being in a first position in a motor mode of operation.

According to another embodiment of the invention, a gas turbine engine is provided. The gas turbine engine includes a compressor rotor and an input shaft rotationally coupled to the compressor rotor. A motor generator device having a motor mode of operation and a generator mode of operation. A hydraulic assembly having a first portion is rotationally coupled to the input shaft and a second portion rotationally coupled to the motor generator device, the hydraulic assembly having a plurality of pistons and a pair of wobbler plates operably coupled between the first portion and the second portion, the pair of wobbler plates being in a first position in a motor mode of operation.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
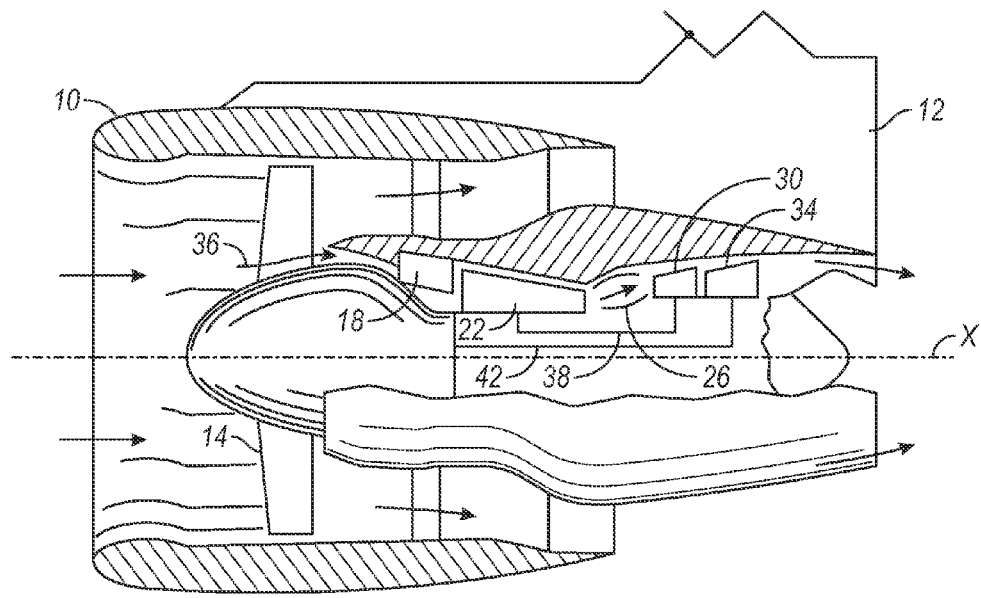
FIG. 1 is a side sectional view of a gas turbine engine.
Figure 2:
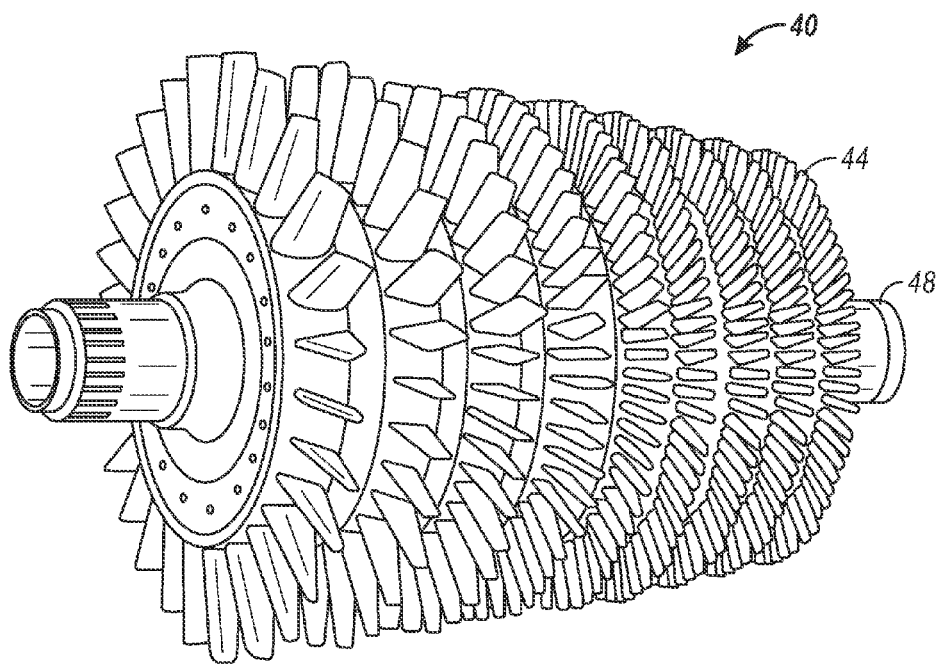
FIG. 2 is a perspective view illustrating a rotor assembly of the gas turbine engine of FIG. 1.

Referring to FIGS. 1 and 2, an example gas turbine engine 10 is used to propel an aircraft 12. The gas turbine engine 10 is an example of a type of turbomachine.

The exemplary gas turbine engine 10 includes in serial communication a fan section 14, a low pressure compressor 18, a high pressure compressor 22, a combustor 26, a high pressure turbine 30, and a low pressure turbine 34. The gas turbine engine 10 is circumferentially disposed about an engine axis "X".

During operation, air is pulled into the gas turbine engine 10 by the fan section 14. Some of the air moves through a flow path 36 to a core of the gas turbine engine 10. The air moving through the flow path 36 is pressurized by the compressors 18 and 22, mixed with fuel, and burned within the combustor 26. The turbines 30 and 34 extract energy from the hot combustion gases flowing from the combustor 26.

In a two spool design, the high pressure turbine 30 utilizes the extracted energy from the hot combustion gases to power the high pressure compressor 22 through a high speed shaft 38, and the low pressure turbine 34 utilizes the extracted energy from the hot combustion gasses to power the low pressure compressor 18 and the fan section 14 through a low speed shaft 42.

The exemplary embodiments described herein are not limited to the two spool engine architecture described, however, and may be used in other architectures, such as single spool axial design, a three spool design, and still other architectures. Further, although the examples described herein are described with regard to the gas turbine engine 10, those having skill in this art and the benefit of this disclosure will understand that other examples include other types of turbomachines.

As known, the compressor sections 18 and 22 include a rotor assembly 40 having blades 44 connected to a shaft Rotating the shaft rotates the rotor blades. The rotor blades 44, when rotated, compress the air moving through the flow path 36.

The rotor assembly 40 rotates to compress air within the compressor sections 18 and 22 during start-up of the engine 10. A motor-generator 54 continues to drive the rotation of the rotor assembly 40 until the rotor assembly 40 reaches a speed capable of compressing enough air to sustain operation of the engine 10. Once the engine 10 is self-sustaining, the turbines 30, 34 are able to suitably drive the rotor assembly 40 without requiring the rotational input from the motor-generator 54. In this example, the motor-generator 54 operates as a generator after the engine 10 has reached self-sustaining speed.

Figure 3:
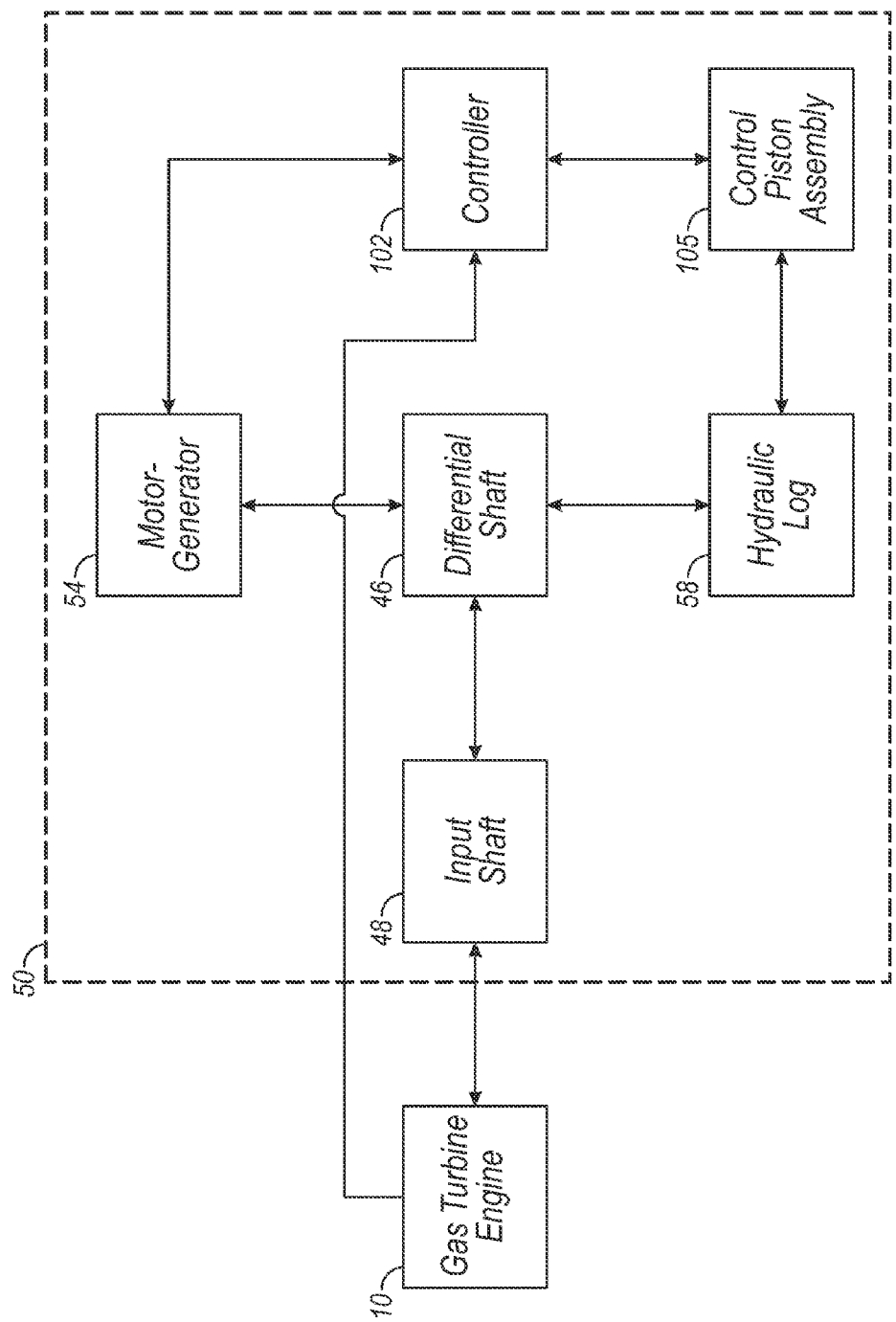
FIG. 3 is a schematic illustration of an arrangement for driving the gas turbine engine of FIG. 1 in accordance with an embodiment of the invention.

Referring to FIG. 3, an arrangement 50 for driving the engine 10 of FIG. 1 includes the motor-generator 54, a hydraulic assembly 58, and a gear differential 46. The motor-generator 54 provides the rotational input to the hydraulic assembly or hydraulic log 58 and differential 46 during start-up of the engine 10.

Once the engine 10 is self-sustaining, the engine 10 is configured to rotate the arrangement's input shaft 48, rather than the input shaft 48 rotating portions of the engine 10. When the engine 10 rotates the input shaft 48, the hydraulic log 58 is configured to provide a rotational input to the differential 46. The differential 46 then provides a rotational input to the motor-generator 54 so that the motor-generator 54 can operate as a generator and provide power in a known manner. The aircraft 12 utilizes power from the motor-generator 54 to operate various devices on the aircraft 12.

As can be appreciated, a relatively consistent supply of power from the motor-generator 54 is required. Variations in the rotational speed of the input shaft 48 would vary the power output from the motor-generator 54 were it not for the hydraulic log 58. The hydraulic log 58, in this example, performs as a hydrostatic transmission that accommodates the varying rotational speeds of the input shaft 48 and provides the motor-generator 54 with a relatively consistent rotational input such that the motor-generator 54 is able to provide a relatively consistent frequency source of power to the aircraft 12.

In one example, the hydraulic log 58 receives the rotational input from the motor-generator 54 during start-up of the engine 10. The hydraulic log 58 then provides a rotational output to the input shaft 48. The hydraulic log 58 adjusts the rotational input to a rotational output suitable for driving the engine 10. A person having skill in this art would understand a rotational output suitable for driving the input shaft 48 during start-up of the engine 10.

The hydraulic log 58 accommodates variability in the rotational output provided by the motor-generator 54 during motor mode and the rotational input provided by the engine 10 during generator mode.

Figure 4:
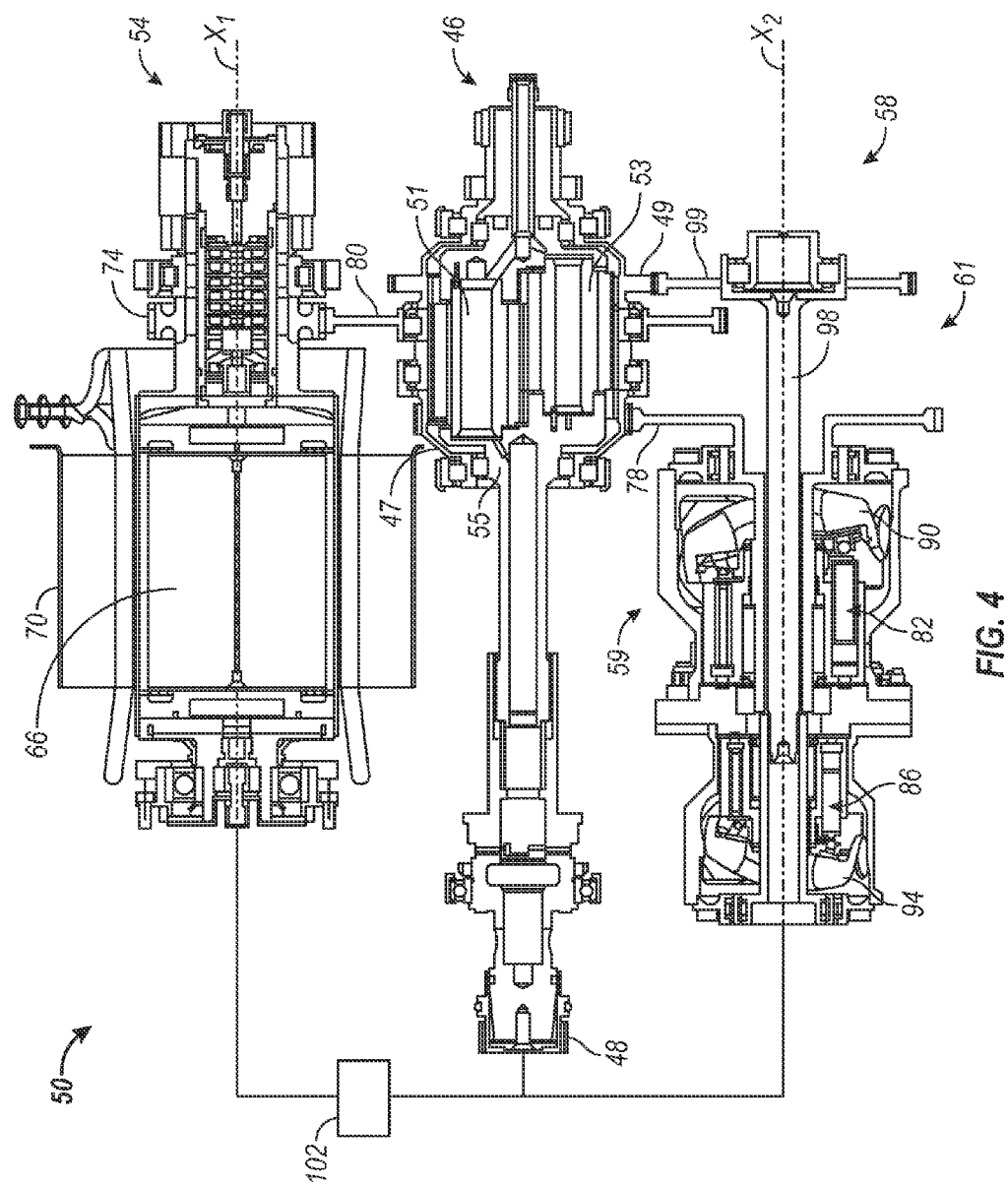
FIG. 4 is a sectional view of the arrangement illustrated in FIG. 3.

Referring now to FIG. 4 with continuing reference to FIG. 3, the motor-generator 54 in the example arrangement 50 includes a rotor 66 and stator 70 arranged about a motor center line $X_1$. The differential 46 includes a pair of annularly spaced apart ring gears 47, 49 meshed with pinions 51, 53 respectively. The motor-generator 54 rotates a gear 74 that is rotatably coupled to the gear 80 on ring gear 49. The input shaft 48 is coupled to the pinions 51, 53 of differential 46 by a carrier 55.

The hydraulic log 58 is operably disposed between the ring gears 47, 49 to perform as a hydrostatic transmission that transfers rotational energy between the motor generator 54 and the input shaft 48. The hydraulic log 58 includes a first portion 59 coupled to the ring gear 47 via a gear 78 and a second portion 61 that is coupled to the ring gear 49 via gear 99.

The hydraulic log 58 further includes a first plurality of pistons 82 and a second plurality of pistons 86. A wobbler plate 90 controls the stroke length of the first plurality of pistons 82. The wobbler plate 90 is adjusted relative to an axis $X_2$ of the hydraulic log 58 to change the stroke lengths of the plurality of pistons 82. A wobbler plate 94 controls the stroke lengths of the second plurality of pistons 86. The wobbler plate 94 is adjusted relative to the axis $X_2$ of the hydraulic log 58 to change the stroke lengths of the second plurality of pistons 86.

When the gas turbine engine 10 is driving the arrangement 50 to provide electric power in generate mode, adjusting the strokes of the first plurality of pistons 82 and the second plurality of pistons 86 adjusts the rotation of a gear 78 relative to the rotation of the hydraulic log shaft 98. The hydraulic log 58 is thus able to increase or decrease the rotational speed of gear 78 relative to the input shaft 48 speed by varying the positions of the wobbler plates 90, 94. The gear differential 46 sums the speed of gear 78 and the speed of the input shaft 48 and produces a resultant output speed on gear 80 to drive the motor-generator 54. The relationship between the speed of gear 78, the speed of input shaft 48, and the speed of gear 80 is constant and is determined by the relative number of teeth on the gears within the differential 46. Control of gear 78 speed relative to the input shaft 48 speed produces a constant speed on gear 80 and on the motor-generator 54. Constant speed on the motor-generator 54 produces a constant frequency electric power output from the arrangement 50.

In the exemplary embodiment, a controller 102 controls the positions of wobbler plates 90, 94 via a control piston assembly 105 connected to each wobbler plate. For example, if the gear 74 is rotating too fast to supply constant frequency power from the motor-generator 54, the controller 102 initiates an adjustment to at least one of the wobbler plates 90, 94 that causes gear 78 to slow its rotation. As can be appreciated, slowing the rotation of gear 78 slows the rotation of gear 74 through the gear differential 46.

Figure 5:
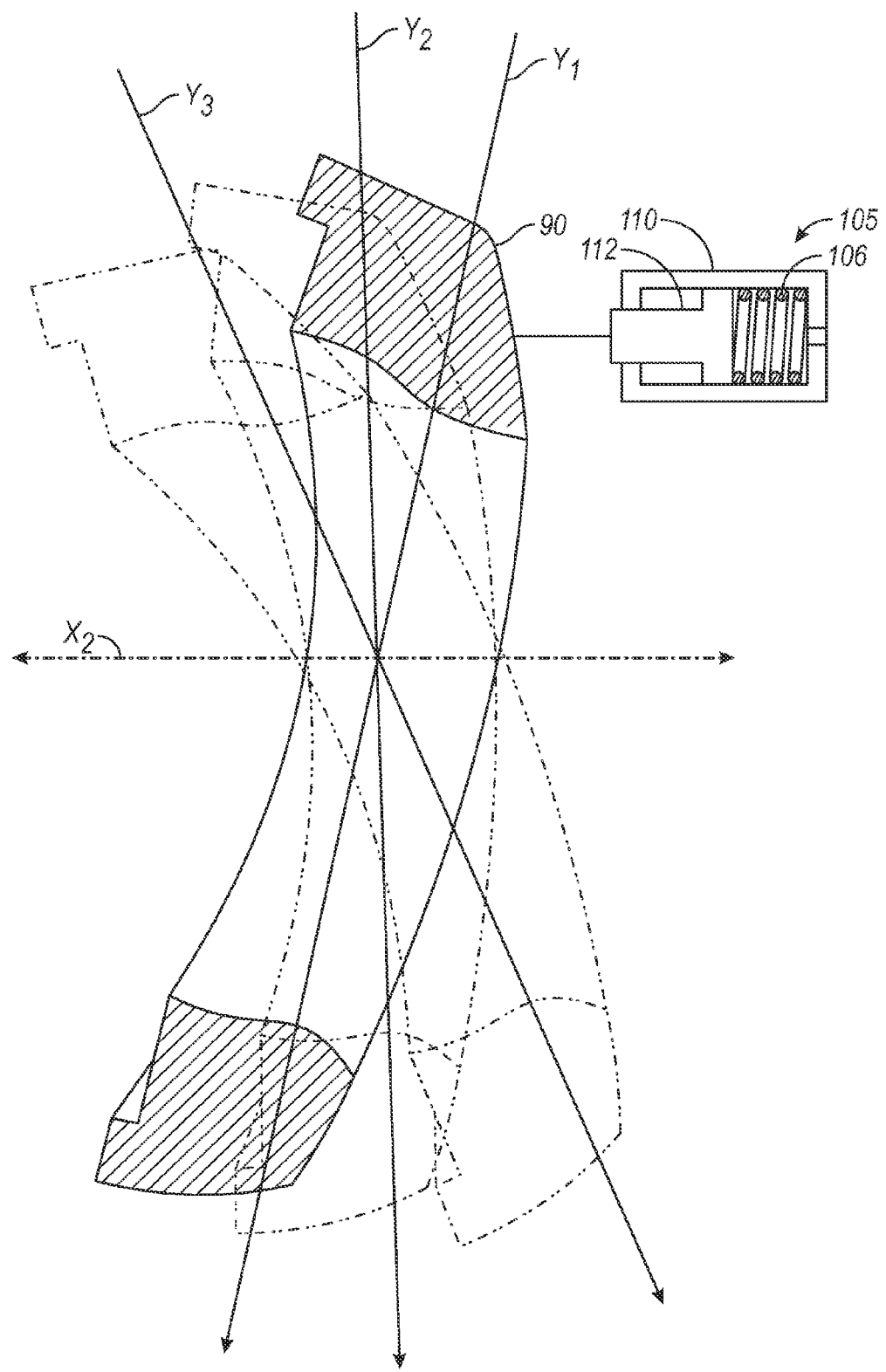
FIG. 5 is schematic illustration of a wobbler plate within the hydraulic log of FIG. 4.

Referring now to FIG. 5 with continuing reference to FIG. 4, the wobbler plates 90, 94 are connected to individual control piston assemblies 105 to enable movement over the range bounded by lines Y1 and Y3. The controller 102 varies the position of the wobbler plates 90, 94 by varying the hydraulic pressure acting on the control pressure side of the piston 110. The control piston assemblies 105 include biasing forces in the form of spring and hydraulic pressure. The hydraulic pressure bias in the control piston assembly 105 for wobbler plate 90 is connected to the working pressure generated by the plurality of pistons 82, 86. A person having skill in this art would understand how to bias the control piston assemblies 105 using a spring 106 and a piston 112, or hydraulic pressure.

During start-up of the gas turbine engine 10, the stator 70 of the motor-generator 54 is connected to an external electric power source. The external power source causes the motor-generator 54 to act as an electric motor and accelerates the rotor 66. During acceleration of the rotor 66, the control 102 initiates an adjustment to both of the wobbler plates 90, 94 to a position of zero displacement that allows the rotor 66 to accelerate while the input shaft is stationary. In this mode, the hydraulic log 58 essentially free-wheels and provides minimal resistance to the motor-generator 54. This allows the rotor 66 to be accelerated with minimal drag torque and essentially declutches the rotor 66 from the input shaft 48 during initial acceleration. A person having skill in this art would understand how this would allow significant size and weight savings for both the motor-generator 54 and the external electric power source.

Once the rotor 66 is accelerated to synchronous speed, it is available to provide significant torque to the input shaft 48 to start the gas turbine engine 10. At this point, the controller 102 initiates adjustments to wobbler plates 90, 94 to cause half of the hydraulic log 58 to function as a hydraulic pump and the other half as a motor at full displacement. Since the plurality of pistons 82, 86 are rotating at the start of this sequence, working pressure rises as the controller 102 adjusts the wobbler plates 90, 94 to vary the displacements of the pistons 82, 86 to be unequal.

The mechanical torque produced by the plurality of pistons 82 is transmitted via gear 78 to the differential 48. In the exemplary embodiment, the gear 78 is coupled to the ring gear 47 on the differential 48. It should be appreciated that this arrangement provides advantages in that the hydraulic log 58 is referenced to a constant speed member instead of the variable speed input shaft 48. As a result, the configuration provides an input summed IDG arrangement.

The gradual addition of torque to the differential 46 causes the input shaft 48 to accelerate and gear 78 to decelerate. Acceleration of input shaft 48 in turn causes the gas turbine engine 10 to accelerate. During acceleration, the controller 102 and control piston assembly 105 for wobbler plate 94 maintains the working pressure in the hydraulic log 58 to a level suitable for acceleration of the gas turbine engine 10. At the start during an initial or first time period, each of the wobbler plates 90, 94 are both moved from a position of zero piston displacement (e.g. position of Line Y2) to a position of maximum piston displacement (e.g. position of Line Y3 for wobbler plate 90 and Line Y1 for wobbler plate 94). Thereafter, during a second time period of the acceleration, the controller 102 then moves wobbler plate 94 towards Line Y2, while maintaining wobbler plate 90 at a position of maximum displacement (e.g. Line Y3), to reduce the displacement of the plurality of pistons 86 which limits the hydraulic pressure and power draw within a desired threshold. Peak torque is maintained from zero RPM until power limiting occurs. The remainder of the start cycle is then maintained at constant power by limiting the electrical current to the motor-generator 54. It should be appreciated that this arrangement provides advantages in start mode operation in that both sets of pistons 82, 86 are spun to rated speed prior to start. This provides additional capability for producing torque at low speed during startup.

As the exemplary gas turbine engine 10 reaches self-sustaining operation, the controller 102 initiate's adjustments to wobbler plate 90 which causes that half of the hydraulic log 58 to transition to a hydraulic motor. Simultaneously, the controller 102 initiates adjustments to the wobbler plate 94 which cause that half of the hydraulic log 58 to transition to a hydraulic pump. Essentially the two halves of the hydraulic log 58 switch roles as they transition from start mode to generate mode.

Once in generate mode, wobbler plate 90 is held in a position aligned with Y1 by the hydraulic bias pressure within control piston assembly 105. In generate mode, controller 102 determines the output frequency of motor-generator 54 and varies the control pressure acting on the control piston assembly 105 to adjust the position of wobbler plate 94 as necessary to maintain a consistent speed of the motor generator.

In one embodiment, the controller 102 determines the current to motor-generator 54 to regulate movement of the wobbler plates 90, 94 during the transition from start to generate mode. If the wobblers 90, 94 are repositioned too fast, the motor-generator 54 current may undesirably climb. Further, if the wobbler plates 90, 94 are repositioned too slow, the gas turbine engine 10 could stall. A person skilled in this art could establish a proper relationship between the decay of current to the motor-generator 54 and the working pressure in the hydraulic log 58.

In one embodiment, the position of the wobbler plate 90, 94 when aligned with the line Y2 corresponds to a motor generator 54 acceleration mode of operation. The position of the wobbler plate 90 when aligned with line Y1 corresponds to a normal generator mode of operation. The position of wobbler plates 90, 94 when between line Y2 and Y3 corresponds to a start mode of operation during which the gas turbine engine 10 is being accelerated.

Features of the disclosed examples include using a motor-generator to start an engine and to provide electric power to the engine during different modes of operation. Another feature includes a lower weight and lower cost design when compared to other motor-generator options.

An embodiment of the invention may be embodied in the form of computer-implemented processes and apparatuses for practicing those processes, for example in controller 102. The present invention may also be embodied in the form of a computer program product having computer program code containing instructions embodied in tangible media, such as floppy diskettes, CD-ROMs, hard drives, USB (universal serial bus) drives, or any other computer readable storage medium, such as random access memory (RAM), read only memory (ROM), or erasable programmable read only memory (EPROM), for example, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to adjust the hydraulic log device to provide a desired level of torque at low speeds during a motor mode of operation while providing a constant rotational speed to the motor generator device during a generate mode of operation.

The capabilities of the embodiments disclosed herein can be implemented in software, firmware, hardware or some combination thereof As one example, one or more aspects of the embodiments disclosed can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately. Additionally, at least one program storage device readable by a machine, tangibly embodying at least one program of instructions executable by the machine to perform the capabilities of the disclosed embodiments can be provided.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An arrangement for driving a turbomachine having a rotor, the arrangement comprising:
   an input shaft rotationally coupled to the rotor;
   a motor generator device, the motor generator device having a motor mode of operation and a generator mode of operation;
   a differential gear device having a first portion rotationally and directly coupled to the input shaft and a second portion rotationally and directly coupled to the motor generator device;
   a hydraulic assembly having a third portion rotationally and directly coupled to the first portion opposite the motor generator device and a fourth portion rotationally and directly coupled to the second portion opposite the motor generator device, the hydraulic assembly having a plurality of pistons and a pair of wobbler plates coupled between the third portion and the fourth portion, the pair of wobbler plates being in a first position in the motor mode of operation, wherein the first position provides a maximum piston displacement in the plurality of pistons, wherein one of the pair of wobbler plates is configured to move to a second position during the motor mode of operation to limit a hydraulic pressure within the hydraulic assembly;
   wherein the pair of wobbler plates includes a first wobbler plate and a second wobbler plate, the first wobbler plate being configured to adjust a stroke of the first plurality of pistons and the second wobbler plate being configured to adjust the stroke of the second plurality of pistons; and
   a controller operably coupled to the input shaft, the motor generator device and the hydraulic assembly, wherein the controller includes a processor that is responsive to executable instructions when executed on the processor for moving the second wobbler plate to reduce a displacement of the second plurality of pistons to limit pressure levels within the hydraulic assembly.

2. The arrangement of claim 1 wherein the controller is further responsive to executable instructions for adjusting a position of the first wobbler plate and the second wobbler plate to adjust a rotational input from the input shaft to provide rotational output that drives the motor generator device when the motor generator device is in the generator mode of operation.

3. The arrangement of claim 2 wherein the first wobbler plate and the second wobbler plate are adjusted to maintain an output rotational speed of the second portion at a substantially constant rotational speed when the motor generator device is in the generator mode of operation.

4. A gas turbine engine comprising:
   a compressor rotor;
   an input shaft rotationally coupled to the compressor rotor;
   a motor generator device, the motor generator device having a motor mode of operation and a generator mode of operation;
   a hydraulic assembly having a first portion rotationally coupled to the input shaft and a second portion rotationally coupled to the motor generator device, the hydraulic assembly having a plurality of pistons and a pair of wobbler plates operably coupled between the first portion and the second portion, the pair of wobbler plates being in a first position in the motor mode of operation;
   a differential gear device coupled to the input shaft and operably disposed between the motor generator device and the hydraulic assembly, the differential gear device having a third portion rotationally coupled between the input shaft and the first portion, the differential gear device further having a fourth portion rotationally coupled between the second portion and the motor generator device;
   wherein the second portion includes a shaft operably coupled to the plurality of pistons and a first gear disposed on an end of the shaft, and the differential gear device includes a ring gear rotationally coupled between the first gear and the motor generator device;
   wherein the plurality of pistons includes a first plurality of pistons and a second plurality of pistons;
   wherein the pair of wobbler plates includes a first wobbler plate and a second wobbler plate, the first wobbler plate being configured to adjust a stroke of the first plurality of pistons and the second wobbler plate being configures to adjust the stroke of the second plurality of pistons; and
   a controller operably coupled to the input shaft, the motor generator device and the hydraulic assembly, wherein the controller includes a processor that is responsive to executable instructions when executed on the processor for moving the second wobbler plate to reduce a displacement of the second plurality of pistons to limit pressure levels within the hydraulic assembly.

5. The gas turbine engine of claim 4 wherein the controller is further responsive to executable instructions for adjusting a position of the first wobbler plate and the second wobbler plate to adjust a rotational input from the input shaft to provide rotational output that drives the motor generator device when the motor generator device is in the generator mode of operation.

6. The gas turbine engine of claim 5 wherein the first wobbler plate and the second wobbler plate are adjusted to maintain an output rotational speed of the second portion at a substantially constant rotational speed when the motor generator device is in the generator mode of operation.

7. A method of driving components within a turbomachine having a rotor, the method comprising:
   providing an input shaft that is rotationally coupled to the rotor;
   providing a motor generator device having a motor mode of operation and a generator mode of operation;
   providing a hydraulic assembly rotationally coupled between the input shaft and the motor generator device, the hydraulic assembly having a plurality of pistons operably coupled to a pair of wobbler plates, wherein the plurality of pistons and the pair of wobbler plates are configured to transfer rotational energy between the input shaft and the motor generator device, the plurality of pistons includes a first plurality of pistons and a second plurality of pistons, and the pair of wobbler plates includes a first wobbler plate and a second wobbler plate, the first wobbler plate being configured to adjust a stroke of the first plurality of pistons and the second wobbler plate being configured to adjust the stroke of the second plurality of pistons;
   providing a controller operably coupled to the input shaft, the motor generator device and the hydraulic assembly;
   moving the pair of wobbler plates to a first position during a first period of the motor mode of operation, wherein the first position provides a maximum displacement in the plurality of pistons; and,
   moving one of the pair of wobbler plates to a second position during a second period of the motor mode of operation to limit a hydraulic pressure within the hydraulic assembly;

moving the second wobbler plate, in response to a signal from the controller, to reduce a displacement of the second plurality of pistons to limit pressure levels within the hydraulic assembly.

8. The method of claim 7 wherein the first position provides a maximum piston displacement in the plurality of pistons, and the second position limits a hydraulic pressure within the hydraulic assembly below a threshold.

9. The method of claim 7 further comprising providing a differential gear rotationally coupled to the input shaft, the hydraulic assembly and the motor generator device.

10. The method of claim 9 wherein:
the hydraulic assembly includes a shaft rotationally coupled to the plurality of pistons on a first end, the shaft having a first gear on a second end;
the motor generator device includes a second gear; and,
the differential gear includes a ring gear coupled to the first gear and the second gear.

* * * * *